April 18 1950

C. W. HANSEN 2,504,328

OVERRUNNING CLUTCH FOR TRACTOR DRAWN
FORAGE CUTTERS AND BLOWERS

Filed June 10, 1946

Inventor
Charles W. Hansen
By Thiess, Olsen & Mecklenburg
Attys.

Patented Apr. 18, 1950

2,504,328

UNITED STATES PATENT OFFICE 2,504,328

OVERRUNNING CLUTCH FOR TRACTOR DRAWN FORAGE CUTTERS AND BLOWERS

Charles W. Hansen, Racine, Wis., assignor to J. I. Case Company, Racine, Wis., a corporation of Wisconsin Application June 10, 1946, Serial No. 675,619

2 Claims. (Cl. 146—107)

My invention relates to overrunning clutches.

One of the objects of my invention is to provide an improved overrunning drive of the ratchet and pawl type.

A further object is to provide such an overrunning drive with improved means for housing the pawls.

A further object is to provide such a construction having a detachable cover for the pawls to enable ready inspection and adjustment of the pawls and springs.

A further object of my invention is to provide an improved overrunning drive for blowers.

Further objects and advantages of the invention will be apparent from the description and claims.

In the drawings, in which two embodiments of my invention are shown,

Figure 1:
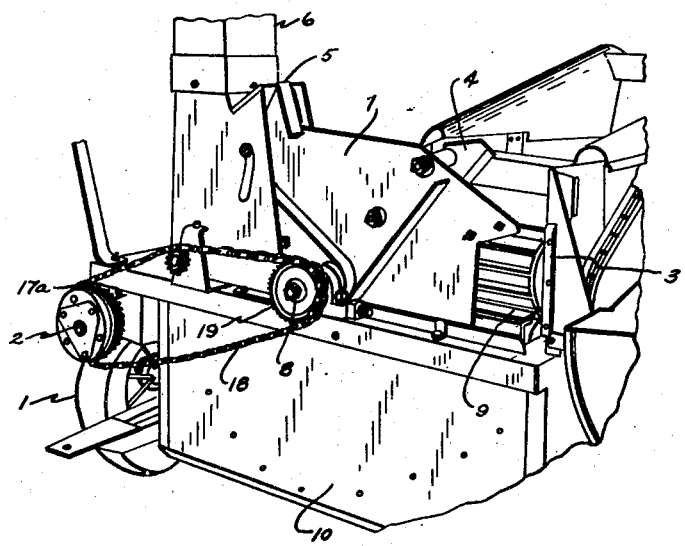
Figure 1 is a perspective view of a forage harvester with fan cover opened.
Figure 3:
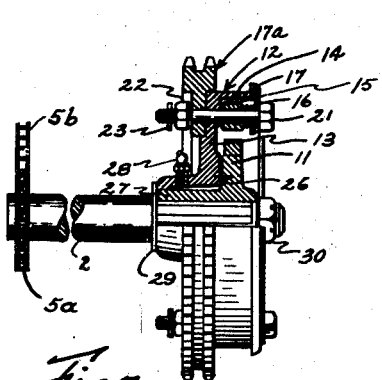
Fig. 3 is a section on the line 3—3 of Fig. 2.
Figure 2:
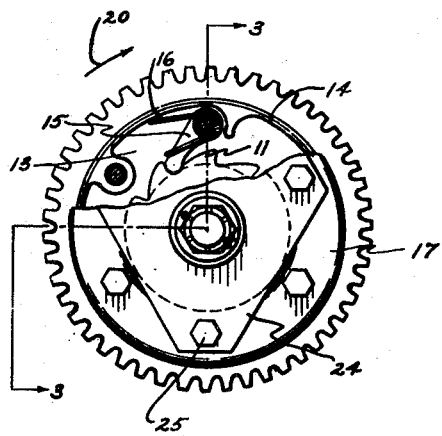
Fig. 2 is a face elevational view of an overrunning drive used in the harvester.

Referring to the drawings in detail, and first to Figs. 1, 2 and 3, the forage harvester shown in a general way comprises a wheeled harvester drawn by a power-driven tractor (not shown). The harvester comprises the carriage having the ground-engaging wheels 1, a shaft 2 driven from the power take-off of the tractor (not shown), cutting sickle mechanism (not shown) and feed mechanism 3 for the cut forage, a rotary cutter 4 and fan 5 for cutting and chopping the material delivered to the housing from the feed mechanism 3 and blowing it into the upwardly-extending delivery pipe 6, transmission including the sprocket 5a on the shaft 2 and the chain 5b driven from the sprocket 5 for driving the cutting sickle mechanism, and feed mechanism 3 from the shaft 2, and transmission for driving the cutting and blowing mechanisms from the shaft 2.

The cutting and blowing mechanism comprises an irregularly shaped rotor 7 secured to rotate with the shaft 8, a plurality of cutting or chopping blades 4 secured to one side of the rotor 7 and co-operating with a shear blade 9 for chopping off short sections of the crop as it is fed in by the feeder 3, and a plurality of radially-extending fan blades 5 secured adjacent the outer portion of the rotor for sweeping and blowing the chopped up forage out of the fan casing into the delivery pipe.

It sometimes happens that the tractor is stopped rather suddenly in consequence of which the cutting sickle and feeding apparatus also stops suddenly. In order to make sure that this sudden stoppage does not leave the fan casing or housing 10 choked with cut material which would interfere with its starting up again, an overrunning drive is provided between the shafts 2 and 8 which will enable the rotor 7 to overrun the drive shaft 2 so that the momentum of the rotor will keep it running for some time after the feed mechanism 3 has stopped, thus cleaning out the fan casing and delivery pipe.

This overrunning drive construction comprises a rotatable ratchet wheel 11, a rotatable pawl-carrying wheel 12 coaxial with the ratchet wheel having a circular web portion 13 and a peripheral cylindrical flange portion 14, and a plurality of pawls 15 pivotally mounted on the web portion inside the flange portion and spring-pressed into engagement with the ratchet teeth by means of the coil torsion springs 16. A detachable annular cover 17 is provided for housing the pawls. A sprocket wheel 17a is secured to the pawl-carrying wheel 12 which drives a chain 18 which, in turn, drives a sprocket wheel 19 secured to the fan and cutter shaft 8. The ratchet teeth face in a direction such that the ratchet wheel 11 will drive the pawl-carrying wheel 12, the rotation of the shaft and wheel being in the direction of the arrow 20 shown in Fig. 2.

The ratchet wheel 11, pawls 15 and cover 17 are secured to the pawl-carrying wheel 12 by means of bolts 21 inserted through registering openings in the cover, pawls, pawl-carrying wheel and ratchet wheel, these bolts being held in place by means of lock nuts 22 and cotter pins 23.

For further housing the ratchet wheel and pawls, a triangular cover plate 24 is provided which extends across the opening in the annular cover plate and is secured to the pawl-carrying wheel by bolts 25 which extend through registering openings in the cover plate and pawl-carrying wheel. The hub 26 of the pawl-carrying wheel is rotatably mounted on the hub 27 of the ratchet wheel, an oiler 28 being provided for lubrication between the hubs. The ratchet wheel and pawl-carrying wheel are held in assembled position by the engagement of the ends of the hubs 26 and 27 with a washer 29 on the drive shaft 2 and by means of a lock nut 30 threaded on the end of the drive shaft 2 and engaging the hub of the ratchet wheel 27.

With this construction, it will be seen that the pawl-carrying wheel 12 can overrun the ratchet wheel 11, thus enabling the fan 5 and cutter 4 to continue running after the feed mechanism has stopped and thus enabling the fan to clean out the fan housing to enable the fan and cutter to start up easily when operation is resumed.

Another advantage of the overrunning clutch arrangement lies in avoiding driving of the tractor through the power take-off from the very substantial momentum of the rotating cutter and blower wheel 7. With a solid connection between wheel 7 and shaft 2, it has been impossible to stop the tractor quickly because of the powerful momentum. With the present arrangement, the tractor may stop instantly while wheel 7 continues to rotate without driving shaft 2.

Figure 4:
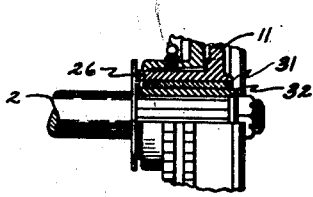
Fig. 4 is a fragmentary sectional view similar to Fig. 3 showing a modification.

The construction shown in Fig. 4 is substantially the same as that shown in Fig. 3 except that a cushioning sleeve 31, which may be of rubber or other suitable material is provided between the sleeve 32, splined on the drive shaft 2, and the hub 26 of the ratchet wheel 11. This enables a cushioned starting of the rotor which carrier the cutting blades and fan blades.

As indicated above, as the tractor draws the harvester in the harvesting operation, the sickle, feeding apparatus 3, cutting or chopping apparatus 4 and fan 5 are driven from the power take-off through the shaft 2. The drive from the shaft 2 to the fan and cutter shaft 8 comprises the overrunning clutch on the shaft 2, the sprocket chain 18, and the sprocket wheel 19.

If, for any reason, the shaft 2 is stopped, the sickle and feed mechanism 3 will stop also. No more forage will be fed into the fan housing under these conditions. However, the fan and cutter will continue to revolve, chopping up any material which may accidentally get into the fan casing and blowing all of the chopped material in the fan casing 10 out through delivery chute 6.

Further modifications will be apparent to those skilled in the art and it is desired, therefore, that the invention be limited only by the scope of the appended claims.

Having thus described my invention, what I claim and desire to secure by Letters Patent is:

1. In a forage blower, a fan housing having an inlet for receiving the forage and a delivery pipe leading therefrom, means for feeding forage into the housing, a rotary cutter in said housing for chopping the forage as it is fed into the housing, a rotary fan in said housing for receiving the chopped forage from the cutter and forwarding it to the delivery pipe, and means including common drive means for driving the feeder means, rotary cutter and fan and including individual transmission between said common drive means and said feeder means on the one hand and between said common drive means and said cutter and fan on the other hand including a forwardly-biased drive one-way overrunning clutch in the individual drive for the rotary fan and cutter which enables momentum to cause the fan and cutter to overrun the feeding means and said common drive means to clear out the material in the housing and delivery pipe when the feeding means and common drive means are stopped, said individual transmission for the cutter and fan including a drive shaft coaxial with and fixed to rotate with said fan and cutter.

2. In a tractor-drawn forage harvester, a shaft driven from the power take off of the tractor, a housing having an inlet for receiving forage and a delivery pipe leading therefrom, means for feeding forage into the housing, a rotary cutter in the housing for chopping the forage as it is fed into the housing, a rotary fan in the housing for receiving the chopped forage from the cutter and forwarding it to the delivery pipe, and transmission from said shaft to said feeding means, rotary cutter, and fan, including individual transmission between said shaft and feeding means on the one hand and between said shaft and said cutter and fan on the other hand including a forwardly-biased drive one-way clutch in the individual drive for the fan and cutter which enables the fan and cutter to overrun the drive shaft and feeding means thus preventing the momentum of the fan and cutter from propelling the harvester, feeding means and tractor after the power take-off ceases to deliver power, said individual transmission for the cutter and fan including a drive shaft coaxial with and fixed to rotate with said fan and cutter.

CHARLES W. HANSEN.

REFERENCES CITED

The following references are of record in the file of this patent:

UNITED STATES PATENTS

| Number | Name | Date |
|---|---|---|
| 84,475 | Burt | Dec. 1, 1868 |
| 305,697 | Loud | Sept. 23, 1884 |
| 733,289 | Silver | July 7, 1903 |
| 860,916 | Harrison | July 23, 1907 |
| 984,155 | Preston | Feb. 14, 1911 |
| 1,043,918 | Frick | Nov. 12, 1912 |
| 1,072,924 | Dick | Sept. 9, 1913 |
| 1,769,163 | Raney et al. | July 1, 1930 |
| 2,152,158 | Slater | Mar. 28, 1939 |
| 2,247,172 | Hayes | June 24, 1941 |
| 2,385,451 | Krause et al. | Sept. 25, 1945 |